US012603942B2

(12) United States Patent     (10) Patent No.: US 12,603,942 B2

Saride     (45) Date of Patent: Apr. 14, 2026

(54) STATIC DISCOVERY FALLBACK FOR QUERY-BASED NETWORK FUNCTION INTERACTION DISCOVERY

(71) Applicant: T-MOBILE INNOVATIONS LLC, Overland Park, KS (US)

(72) Inventor: Prannoy Kiran Saride, Bothell, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/749,328

(22) Filed: Jun. 20, 2024

(65) Prior Publication Data

US 2024/0340352 A1     Oct. 10, 2024

Related U.S. Application Data

(63) Continuation of application No. 18/203,370, filed on May 30, 2023, now Pat. No. 12,052,319.

(60) Provisional application No. 63/346,459, filed on May 27, 2022.

(51) Int. Cl.
    *H04L 67/51*     (2022.01)
    *G06F 16/903*     (2019.01)
    *H04L 67/63*     (2022.01)

(52) U.S. Cl.
    CPC ........ *H04L 67/51* (2022.05); *G06F 16/90335* (2019.01); *H04L 67/63* (2022.05)

(58) Field of Classification Search
    CPC .... H04L 67/51; H04L 67/63; G06F 16/90335
    USPC ....................................................... 709/223
    See application file for complete search history.

(56) References Cited

U.S. PATENT DOCUMENTS

| | | | |
|---|---|---|---|
| 2020/0028921 A1* | 1/2020 | Cai ......................... | H04L 67/60 |
| 2022/0272622 A1 | 8/2022 | De-Gregorio-Rodriguez et al. | |
| 2022/0295386 A1* | 9/2022 | Lu ........................... | H04L 67/51 |

(Continued)

FOREIGN PATENT DOCUMENTS

WO     2013/119773 A1     8/2013

OTHER PUBLICATIONS

Notice of Allowance received for U.S. Appl. No. 18/203,370, mailed on Mar. 26, 2024, 10 pages.

*Primary Examiner* — Wing F Chan
*Assistant Examiner* — Leon Y Tseng
(74) *Attorney, Agent, or Firm* — SHOOK, HARDY & BACON L.L.P.

(57) ABSTRACT

Systems and methods are provided for an improved method of network function interaction. In order for a network function consumer to interact with a network function producer, the network function consumer utilizes a default query-based discovery process, wherein a component such as a network resource function identifies candidate network function producers. A secondary static configuration is created for use if the primary query-based process is unavailable. Based on a determination that the primary query-based process is unavailable, the network function consumer identifies a network function producer from the static configuration and communicates one or more service requests to the network function producer. Once it is determined that primary query-based discovery is available, the network function consumer reverts to the query-based discovery process for subsequent network function interactions.

20 Claims, 4 Drawing Sheets

(56)           References Cited

U.S. PATENT DOCUMENTS

2023/0308908  A1     9/2023  Rajput et al.

* cited by examiner

400

410

DETERMINE QUERY-BASED DISCOVERY
PROCESS IS UNAVAILABLE

420

ACCESS STATIC CONFIGURATION REPOSITORY

430

COMMUNICATE  NF SERVICE REQUEST

440

RE-ATTEMPT QUERY-BASED DISCOVERY

STATIC DISCOVERY FALLBACK FOR QUERY-BASED NETWORK FUNCTION INTERACTION DISCOVERY

CROSS-REFERENCE TO RELATED APPLICATIONS

This application is a continuation of, and claims priority to, U.S. patent application Ser. No. 18/203,370, filed on May 30, 2023, which claims the benefit of U.S. Patent Application No. 63/346,459, filed on May 27, 2022, the entireties of which are incorporated herein by reference.

SUMMARY

The present disclosure is directed, in part, to utilizing a static configuration fallback for query-based network function interaction discovery, substantially as shown in and/or described in connection with at least one of the figures, and as set forth more completely in the claims.

In aspects set forth herein, a static configuration for network function discovery is created and utilized upon a determination that a default query-based discovery process is unavailable. Modern telecommunication networks utilize functionally-defined network functions for the provision of any number of user-desirable services. In order to discover and select an appropriate network function producer to provide a network function service, a network function consumer may use a query-based process. The network function consumer queries an entity, such as a network repository function, in order to discover which network function producers are available. When communication links/interfaces and network repository functions operate nominally, the network function consumer initiating a discovery request should not generally encounter a problem identifying/selecting an appropriate network function producer; however, if the network function consumer fails to successfully complete the query-based discovery process, it may be unable to identify, and therefore unable to communicate a service request to, a network function producer. By creating a static configuration backup and then using the static configuration when it is determined that the query-based process is unavailable, network function consumers will be enable to more seamlessly communicate with network function producers.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
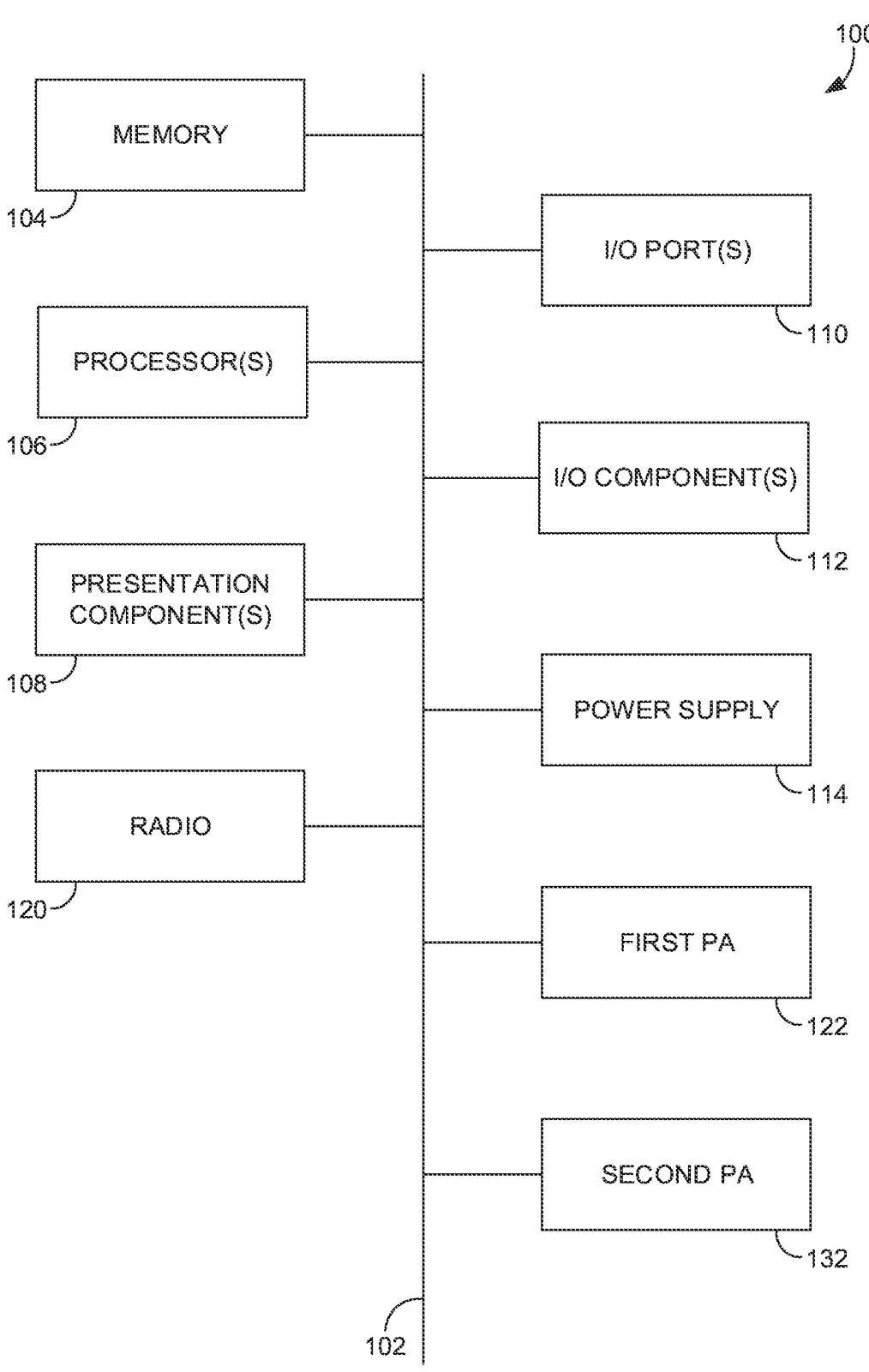
FIG. 1 depicts an exemplary computing environment suitable for use in implementations of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022).

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, modern telecommunication networks utilize a plurality of functionally-defined instances, known as network functions in order to provide services to users. From authentication to mobility, network slicing to user plane functionality, traditional components of a telecommunication core network are increasingly separated into more precisely-functionally-defined segments. In order to operate correctly, network functions interact with each other to request and respond to service requests. A network function that requests a service is known as a network function consumer and a network function that provides the service is known as a network function producer. There are presently four models defined in the 3GPP specifications for facilitating the interactions between a network function consumer and a network function producer; three of the four models include the use of a network resource function to provide a query-based discovery or selection process, wherein a network consumer (directly, or via a service communication proxy) queries the network resource function to discover one or more candidate network function producers that are available to fulfill the network function consumer's service request. This query-based discovery/selection process is agnostic to the form of the network function consumer and the network function producer (e.g., the consumer could be an AMF, AUF, SMF, UPF, etc., and the producer could be a UDM, UDR, SMF, etc.). Once the query-based discovery process is complete, the network function consumer interacts with the network function producer identified by the network resource function from the query-based discovery process.

The query-based discovery process has significant advantages over static configurations (such as used by default in model "A" of the NF-NF interaction scheme set forth in 3GPP TS 23.501). Utilizing the query-based approach, a network function consumer can essentially select and communicate a network function producer without (or with significantly less) risk that the network function producer is too congested or otherwise unavailable to fulfill the service request, which could be a factor of a particular network function producer or a communication link between the network function producer and the network. Current solutions, particularly as set forth in the technical specifications, do not foresee the unfortunately realistic occasion that the one or more components used in the query-based discovery process (e.g., the network resource function) fail to answer the network function consumer's discovery request. Whether because of an unavailable link or because the network resource function, itself, is unavailable, the network function consumer's inability to complete the query-based discovery process is likely to lead to a failure of the network function consumer to identify (and therefore successfully request a network service request to) an appropriate network function producer.

In order to solve these problems, the present disclosure is directed to systems, methods, and computer readable media that improve conventional network function interaction models by using a static configuration when it is determined that a default query-based discovery process is unavailable. By creating and storing a static configuration that is available to network function consumers but relying on the query-based discovery process as a default configuration, network function consumers will retain the benefits of the query-based discovery process unless network function discovery resources such as the network resource function are unavailable. Utilizing the static configuration as a fallback or backup configuration only if the query-based discovery resource is unavailable (or performing sufficiently undesirably so as to materially degrade performance of the network function consumer), the network function consumer retains the highest possible level of functionality for network function service interactions.

Accordingly, a first aspect of the present disclosure is directed to a method for network function interaction. The method comprises creating a static network function configuration comprising one or more network function producers. The method further comprises storing the static network function configuration. The method further comprises determining that a primary query-based discovery process is unavailable, the primary query-based discovery process comprising obtaining network function producer information from a network resource function. The method further comprises identifying a candidate network function producer from the one or network function producers of the static network function configuration. The method further comprises communicating a network function service request from the network function consumer to the candidate network function producer.

Referring to FIG. 1, an exemplary computer environment is shown and designated generally as computing device 100 that is suitable for use in implementations of the present disclosure. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to a an access point and receive one or more signals from the access point (or some other access point); the computing device 100 may be referred to herein as a user equipment, wireless communication device, or user device, The computing device 100 may take many forms; non-limiting examples of the computing device 100 include a cell phone, tablet, internet of things (IoT) device, smart appliance, automotive or aircraft component, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114.

Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

A first radio 120 and second radio 130 represent radios that facilitate communication with one or more wireless networks using one or more wireless links. In aspects, the first radio 120 utilizes a first transmitter 122 to communicate with a wireless network on a first wireless link and the second radio 130 utilizes the second transmitter 132 to communicate with a wireless network on a second wireless link. Though two radios are shown, it is expressly conceived that a computing device with a single radio (i.e., the first radio 120 or the second radio 130) could facilitate communication over one or more wireless links with one or more wireless networks via both the first transmitter 122 and the second transmitter 132. Illustrative wireless telecommunications technologies include CDMA, GPRS, TDMA, GSM, and the like. One or both of the first radio 120 and the second radio 130 may carry wireless communication functions or operations using any number of desirable wireless communication protocols, including 802.11 (Wi-Fi), WiMAX, LTE, 3G, 4G, LTE, 5G, NR, VoLTE, or other VoIP communications. In aspects, the first radio 120 and the second radio 130 may be configured to communicate using the same protocol but in other aspects they may be configure dot communicate using different protocols. In some embodiments, including those that both radios or both wireless links are configured for communicating using the same protocol, the first radio 120 and the second radio 130 may be configured to communicate on distinct frequencies or frequency bands (e.g., as part of a carrier aggregation scheme). As can be appreciated, in various embodiments, each of the first radio 120 and the second radio 130 can be configured to support multiple technologies and/or multiple frequencies.

Figures 2A, 2B, 2C:
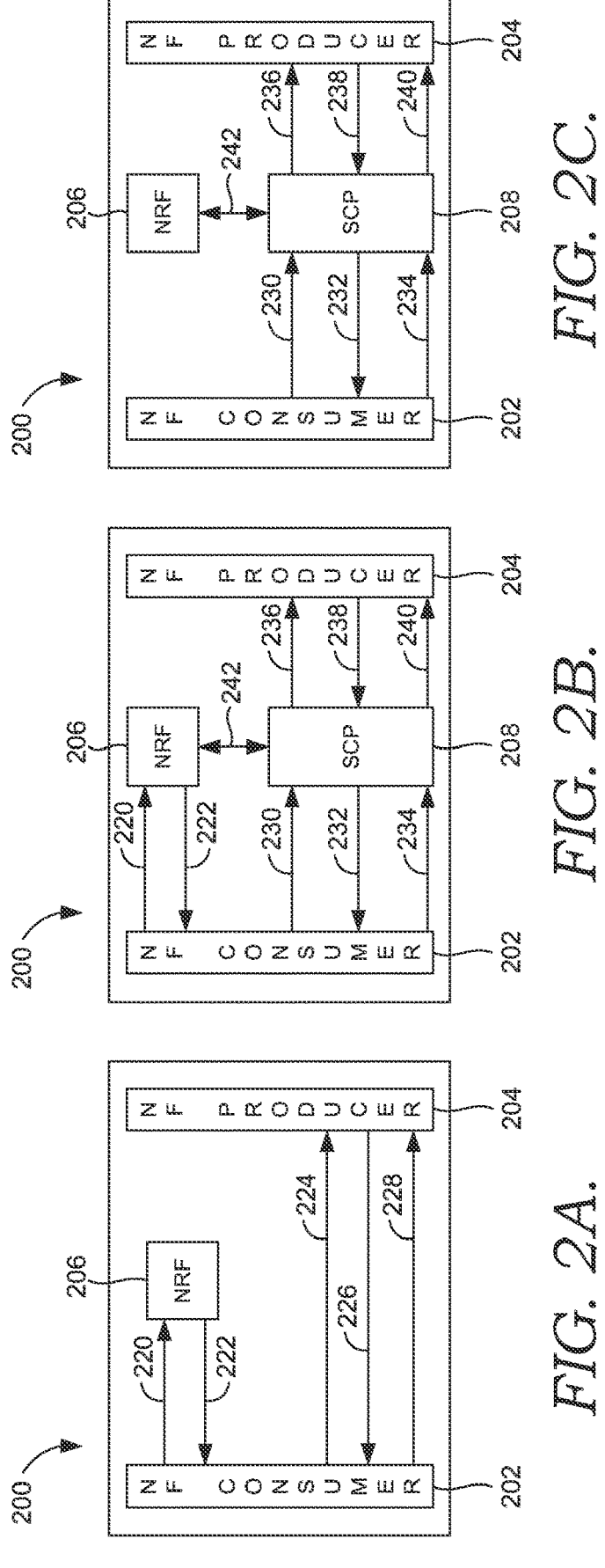
FIGS. 2A-2C depict exemplary networks in which implementations of the present disclosure may be employed.

Turning now to FIGS. 2A-2C, various embodiments are illustrated of a network environment in which the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

The network environment 200 generally represents a communication model for interaction between two or more network functions (NFs) within a core network of a telecommunication service provider. Generally, a first network function (NF), known as an NF consumer consumes services provided by another NF, known as an NF producer in order to perform any one or more necessary or desirable operations of a telecommunications network. For example, if a UE, such as the computing device 100 of FIG. 1, initiates a wireless voice call, the call setup process may include an interaction between a session management function (SMF) and a unified data management (UDM) function in order to obtain subscriber profile information associated with the UE. In this example, the process by which the SMF discovers, selects, and then communicates requests and responses with the UDM is known as NF-NF service interaction. A network function, as used herein, is meant to refer to one or more computer processing components, storage components, and/or software instances that has a functionally-defined behavior and communication interface; for example, an access mobility function (AMF), session management function (SMF), user plane function (UPF), unified data management (UDM), and many others are network functions in 3GPP/5G networks.

Current implementations for NF-NF service interaction take one of four forms, known as communication models in technical specification such as 3GPP TS23.501. In a first form, not illustrated, an NF consumer directly communicates with an NF producer of their choice—all without an intermediary network resource function (NRF) or a service communication proxy (SCP). In the first form, query-based discovery is not used. In a second form, illustrated in FIG. 2A, an NF consumer 202 discovers NF producers by querying an NRF 206 using a discovery query 220; based on a discovery result 222 that is sent back to the NF consumer 202 indicating one or more available NF producers, the NF consumer can select the NF producer 204 and subsequently communicate a service request 224 to the NF producer 204. After processing the service request 224, the NF producer 204 communicates a service response 226 directly to the NF consumer 202 and any subsequence requests 228 are directly communicated from the NF consumer 202 to the NF producer 204, and the process repeats as necessary. In a third form, illustrated in FIG. 2B, the same discovery and NF profile interaction between the NF consumer 202 and the NRF 206 is utilized; however, instead of directly communicating service requests and responses between the NF consumer 202 and the NF producer 204, an SCP 208 facilitates communication. Based on the discovery result, the NF consumer selects one or more NF producers. In some aspects of this form, the SCP 208 interacts with the NRF 206 using one or more selection communications 242 to get NF producer selection parameters (such as location, capacity, and the like) in order to select and subsequently communicate service requests form the NF consumer 202 to an NF producer in the set of NF producers selected by the NF consumer. Accordingly, a first service request 230 is communicated from the NF consumer 202 to the SCP 208, a second service request 236 is communicated from the SCP 208 to the selected NF producer 204, a first service response 238 is communicated from the NF producer 204 to the SCP 208, a second service response 232 is communicated from the SCP 208 to the NF consumer 202, and any subsequent service requests are routed from the NF consumer 202 to the NF producer 204 via the SCP 208 using a first subsequent request 234 and a second subsequent request 240. Finally, in a fourth form illustrated in FIG. 2C, NF consumers such as the NF consumer 202 do not do any discovery or selection. In lieu of conducting NF discovery, the NF consumer 202 includes any discovery and/or selection parameters in the first service request 230 that is communicated form the NF consumer 202 to the SCP 208. Subsequently, the one or more selection communications 242 between the SCP 208 and the NRF 206 are utilized to identify and select a suitable NF service producer. The remaining series of service requests and responses between the NF producer 204 and the NF consumer 202 via the SCP 208 are then the same as in the third form.

Any embodiment of network environment 200 described with reference to FIGS. 2A-2C may be used for the provision of any number of network function services. Notably, in all current forms of interactions between NF consumers and NF producers, either an NRF (with or without an SCP) is utilized for query-based NF producer discovery and selection or, in the case of the first form, an NF consumer only uses a local configuration profile for NF producer selection. That is, current solutions for interactions between NF consumer and NF producers (i.e., NF-NF interactions) either utilize a query-based process or a static process—not both. One critical advantage of using the query-based discovery process is that the NRF (alone or in combination with the SCP) may be used to select the best (or a desirable) NF producer in order to provide an NF service to the NF consumer. That is, query-based discovery is uniquely beneficial in instances where a particular network comprises multiple candidate NF producers, and a first NF producer is either unavailable, at capacity, or located at a great distance with high latency; the query-based process, as opposed the static-only model A configuration, would identify and facilitate selection of a second NF producer by the NF consumer.

Figure 3:
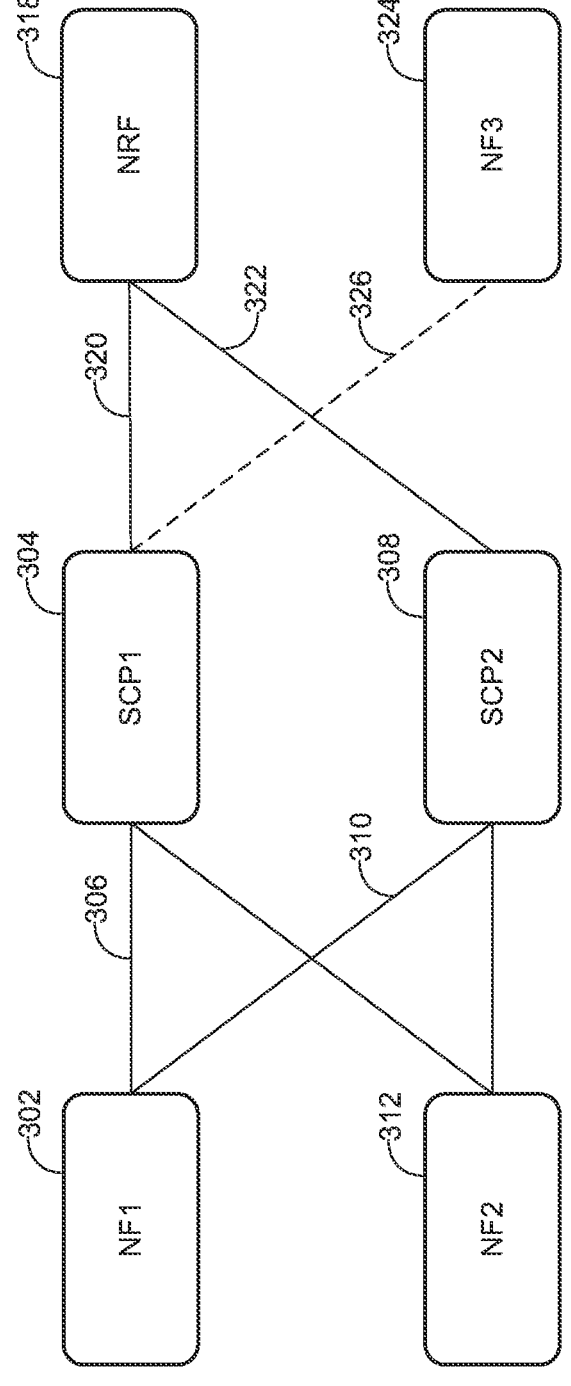
FIG. 3 depicts an exemplary network in which implementations of the present disclosure may be employed.

Turning now to FIG. 3, an improved network environment 300 is illustrated for use with the present disclosure. The network environment 300 includes a plurality of network functions, at least one network resource function, and in some aspects may comprise one or more service communication proxies, which are used to perform an improved method of NF-NF interaction. The network environment 300 comprises a first network function 302, which may be known as an NF consumer (such as the NF consumer 202 of FIGS. 2A-2C). The first network function 302 utilizes one or more components to discover and select an NF producer; in one aspect, the first network function 302 is connected to a first SCP 304 via a first link 306 and may utilize the first link 306 as a default procedure to dynamically discover and select an NF producer (however, in the case of a model such as the one depicted in FIG. 2A where an SCP is absent, the first link 306 may connect the first network function 302 and the NRF 318 directly). Under normal operating procedures, the first network function 302 may utilize the first link 306 (or a direct connection with the NRF 318) to discover and select an NF producer such as a third network function 324. If the first link 306 fails, or the first network function 302 is otherwise unable to perform query-based NF producer discovery, the first network function may be unable to perform its intended functions. Aspects of the present disclosure are directed to providing a static backup to the default query-based discovery and selection process that the first network function 302 performs.

In order to utilize a secondary static configuration for network function discovery and interaction, a static network configuration will be created and stored in a location independent of the NRF 318. In one aspect the static network configuration will be created and stored at each NF consumer, such as the first network function 302 or a second network function 312; in another aspect, such as aspects per the forms shown in FIGS. 2B and 2C, the static network configuration will be created and stored at a proxy such as the first SCP 304 or a second SCP 308, accessible by one or more NF consumers such as the first network function 302 and the second network function 312. In yet other aspects, the static network configuration may be stored in other locations that, so long as they are not the NRF 318 (e.g., the static network configuration could be stored on a UDR).

The static network configuration may be created, replaced, or updated as desirable by a particular network operator. In a first aspect, the static network configuration may be created when the location in which the static network configuration is put in service; in other words, if the static network configuration is to be stored on the first network function 302, then the static network configuration could be created when the first network function 302 is put in to service. Referred to as an in-service aspect, the static network configuration in this aspect may reflect the configuration of the network at the time the storage location is put in-service or at a previous/predetermined time. For example, if the first network function 302 is put in service earlier than the second network function 312, the configuration of the network (i.e., the existence/details of NF producers) is different, and the static network configuration is based on the time of the NF consumer being placed in-service, then the static network configuration stored by the first network function 302 would be different than the static network configuration stored by the second network function 312. In another aspect, the static network configuration may be replaced, whether regularly or upon an event occurring; for example, the static network configuration stored by one or more of the first network function 302 and the second network function 312 may be overwritten and replaced by a new static network configuration at a predetermined interval (e.g., once every hour, once a day, once per week, and the like), or upon an event taking place (e.g., a new component such as a network function consumer, network function producer, SCP, NRF, or any other desirable component is put in to service, or upon every successful completion of a query-based discovery process). In a third aspect, the static network configuration may be replaced at a pre-determined interval or upon an event taking place, wherein the static network configuration is checked for staleness or compared to information obtained from an NRF during a query-based discovery process, or any other desirable manner. In any aspect, the static network configuration may be created, replaced, or updated based on information of the network configuration from an NRF such as the NRF 318 or based on information populated and stored by a network operator in another location such as a unified data repository.

Even though the static network configuration is available to network function consumers such as the first network function 302, the present disclosure only utilizes the secondary static configuration when it is determined that the primary query-based process is unavailable or degraded. That is, upon a determination or indication that the first network function 302 is unable to utilize the default/primary query-based discovery process (or that the query-based discovery process is sufficiently degraded, which may be manifested by a greater than threshold delay or latency in receiving an answer from the destination of the query-based discovery request), the first network function 302 will revert to the backup/secondary static configuration. Such a determination may be made by the first network function 302 or by one or more other computer processing components; in some aspects, the determination may be based on a determination that a communication link used for query-based discovery (e.g., the first link 306 or a link between an SCP, such as the first SCP 304, and an NRF, such as the NRF 308) is down or disrupted, the NRF 318 is unavailable or degraded/congested (e.g., based on requests to the NRF 318 timing out, responses taking a greater than predetermined threshold amount of time, receiving 404 or 503 errors, a TCP failure a buffer overflow, or any other error or state that is indicative of failure or degradation of the first link 306), the NRF 318 is unavailable or operating abnormally, or on an indication that affirmatively indicates that the link 306 is not functioning normally. Regardless of how it is determined that the default query-based discovery process is unavailable to the first network function 302, the first network function 302 will switch from the primary/default query-based discovery process to the secondary/backup static configuration.

Upon a determination that the primary query-based discovery process is unavailable, an NF consumer such as the first network function 302 will utilize the secondary static configuration. Prior to falling back to the secondary static configuration, an NF consumer such as the first network function 302 may test other paths to an NRF that is determined or indicated to be disrupted, such as the NRF 318, in order to confirm that the NRF is, in fact, disrupted. For example, if the first network function 302 typically conducts a query-based discovery with the NRF 318 utilizing the first communication link 306, the first SCP 304, and a third communication link 320, and if the first network function

302 determines or receives an indication that the NRF 318 is unavailable or degraded, then the first network function 302 may, prior to falling back to the secondary static network configuration, attempt to communicate with the NRF 318 via a second communication link 310, a second SCP 308, and a fourth communication link 322 (or any other route to the NRF 318 wherein one or more links or intervening components are different between the first attempt and the second attempt). In other aspects, the first network function 302 may additionally or alternatively attempt query-based discovery using a second NRF (not pictured) if it is determined or indicated that the NRF 318 is unavailable or degraded. In another aspect, upon a determination or indication that the NRF 318 is unavailable or degraded, the first network function 302 may wait for a predetermined period of time and then re-attempt the same query based discovery with the NRF 318, and may further repeat the re-attempts a predetermined number of times before falling back to the secondary static configuration. Regardless of what combination of features is utilized prior to falling back to the secondary static configuration, once the secondary static configuration is invoked, the first network function 302 queries the static network configuration, whether it is local to the first network function 302 or requires communicating one or more queries to the first SCP 304 via the first communication link 306. The static network configuration generally comprises information relating identities, locations, and functions of one or more NF producers, or as otherwise defined in 3GPP TS23.501. Using the static network configuration, a candidate NF producer, such as the third network function 324, is identified and then the NF consumer, such as the first network function 302, communicates network function service requests thereto, using a communication link from the static network configuration, such as a fifth communication link 326. In aspects, after a predetermined/configurable amount of time or upon communication or completion of a predetermined number of network function service requests, the first network function 302 will re-attempt to use the primary query-based discovery process and revert to said primary process as soon it is determine to be available or the degradation is no longer occurring.

Figure 4:
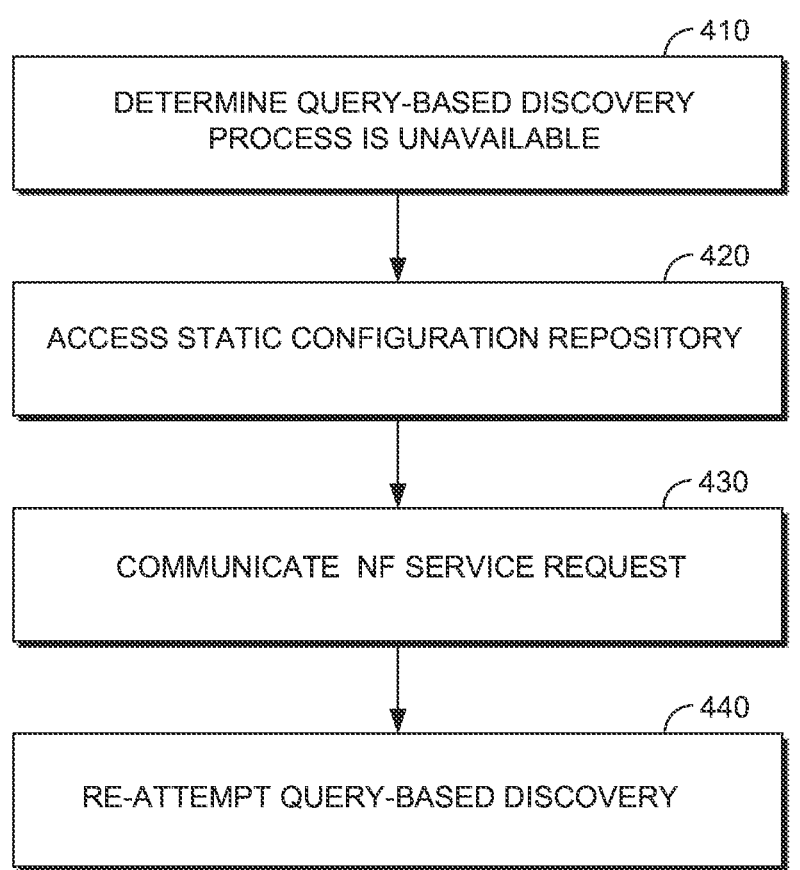
FIG. 4 depicts a flow diagram of an exemplary method for network function interactions, in accordance with aspects herein.

Turning now to FIG. 4, a flow chart is provided for a method 400 for using a static configuration fallback for NF-NF interactions. At a first step 410, it is determined that a default query-based NF discovery process has failed, according to any one or more aspects described herein. At a second step 420, in response to determining that the query-based NF discovery process has failed, an NF consumer such as the NF consumer 202 of FIGS. 2A-2C or the first NF 302 of FIG. 3 accesses a static configuration repository and selects an NF producer, according to any one or more aspects described herein. At a third step 430, the NF consumer communicates one or more NF service requests to the NF producer selected from the static configuration repository, in accordance with any one or more aspects described herein. In some aspects, the method 400 additionally comprises a fourth step 440, wherein after a predetermined period of time, the NF consumer re-attempts to utilize the default query-based NF discovery process, in accordance with any one or more aspects described herein.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for network function interaction, the method comprising:
    determining that a primary query-based discovery process is unavailable to a network function consumer, the primary query-based discovery process comprising dynamically identifying an available network function producer;
    querying a static network function producer configuration to identify a candidate network function producer; and
    communicating a network function service request from the network function consumer to the candidate network function producer.

2. The method of claim 1, wherein the primary query-based discovery process comprises using a service communication proxy.

3. The method of claim 1, wherein determining that the primary query-based discovery process is unavailable is based on an indication that a link between the network function consumer and a network resource function is disrupted.

4. The method of claim 1, wherein determining that the primary query-based discovery process is unavailable is based on a determination that a discovery response from a network resource function has not been received by the network function consumer within a predetermined period of time.

5. The method of claim 1, wherein determining that the primary query-based discovery process is unavailable is based on a determination that a network resource function has a greater than predetermined threshold congestion level.

6. The method of claim 1, wherein determining that the primary query-based discovery process is unavailable is based on a determination that the network function consumer has received a greater than threshold number of request failures in response to the network discovery request, the request failures comprising a 404 error message, a 503 error message, or a TCP buffer overflow message.

7. The method of claim 1, further comprising re-attempting the primary query-based discovery process after a predetermined period of time.

8. The method of claim 1, further comprising re-attempting the primary query-based discovery process in response to an indication that the primary query-based discovery process is available to the network function consumer.

9. The method of claim 1, wherein determining that the primary query-based discovery process is unavailable to the network function consumer comprises unsuccessfully attempting to communicate with a network resource function using a plurality of routing paths.

10. The method of claim 1, wherein the static network function configuration is created based on the one or more network function producers being available to the network resource consumer at a time the network resource consumer is placed in service.

11. A system for network function interaction, the system comprising:

a network function consumer;
    a network function producer; and
    one or more networked computer processing components coupled to at least one memory, the at least one memory being configured to store computer-readable instructions, the computer-readable instructions causing the one or more networked computer processing components to perform a method comprising:
    determining that a primary query-based discovery process is unavailable to a network function consumer, the primary query-based discovery process comprising dynamically identifying an available network function producer;
    querying a static network function producer configuration to identify a candidate network function producer; and
    communicating a network function service request from the network function consumer to the candidate network function producer.

12. The system of claim 11, wherein the one or more computer processing components are further configure to, after a predetermined amount of time, re-attempt the primary query-based discovery process with the network resource function.

13. The system of claim 11, wherein said querying occurs in response to a number of request failures between the first network function consumer and a network resource function exceeding a predetermined threshold.

14. The system of claim 11, wherein said querying occurs in response to a determination that each of a first network resource function and a second network resource function are unavailable.

15. The system of claim 11, wherein said querying occurs in response to a determination that each of a first communication path and a second communication path are unavailable.

16. The system of claim 11, wherein said querying occurs in response to a determination that a first network resource function is unavailable.

17. The system of claim 11, wherein said querying occurs in response to a determination that a communication link between the network function consumer and a network resource function is disrupted.

18. The method of claim 11, wherein the primary query-based discovery process comprises using a service communication proxy.

19. A non-transitory computer readable media having instructions thereon that, when executed by one or more computer processing components, cause the one or more computer processing components to perform a method for network function interaction comprising:
    determining that a primary query-based discovery process is unavailable to a network function consumer, the primary query-based discovery process comprising dynamically identifying an available network function producer;
    querying a static network function producer configuration to identify a candidate network function producer; and
    communicating a network function service request from the network function consumer to the candidate network function producer.

20. The non-transitory computer readable media of claim 19, wherein the static network function producer configuration is stored at the network function consumer.

* * * * *